United States Patent
Choi et al.

(10) Patent No.: US 8,555,058 B2
(45) Date of Patent: Oct. 8, 2013

(54) METHOD OF DISTRIBUTING GROUP IDS IN PLC NETWORK, METHOD OF RECEIVING GROUP IDS IN PLC NETWORK, AUTHENTICATION APPARATUS, AND PLC APPARATUS

(75) Inventors: Jun-hae Choi, Seongnam-si (KR); In-hwan Kim, Suwon-si (KR); Seung-gi Chang, Seoul (KR); Joon-hee Lee, Gunpo-si (KR); Ju-han Lee, Suwon-si (KR); Ji-hoon Kim, Hwaseong-si (KR); Ho-jeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 798 days.

(21) Appl. No.: 11/585,109

(22) Filed: Oct. 24, 2006

(65) Prior Publication Data
US 2007/0220088 A1    Sep. 20, 2007

(30) Foreign Application Priority Data
Mar. 14, 2006 (KR) .................. 10-2006-0023572

(51) Int. Cl.
*H04L 29/06*    (2006.01)
(52) U.S. Cl.
USPC ........... 713/163; 709/203; 709/225; 709/245; 379/413.03
(58) Field of Classification Search
USPC ..... 709/203, 225, 245; 340/825; 379/413.03
See application file for complete search history.

(56) References Cited

U.S. PATENT DOCUMENTS

| 6,348,875 B1 * | 2/2002 | Odinak et al. ........... 340/825.52 |
| 6,759,946 B2 | 7/2004 | Sahinoglu et al. |
| 6,885,674 B2 | 4/2005 | Hunt et al. |

(Continued)

FOREIGN PATENT DOCUMENTS

| JP | 2002-245235 A | 8/2002 |
| JP | 2002-325079 A | 11/2002 |

(Continued)

OTHER PUBLICATIONS

Communication dated Mar. 21, 2011 from the European Patent Office in counterpart European application No. 07100178.8.
Communication dated Apr. 12, 2011 from the Japanese Patent Office in counterpart Japanese application No. 2007-010711.

(Continued)

*Primary Examiner* — Jeffrey Pwu
*Assistant Examiner* — Michael D Anderson
(74) *Attorney, Agent, or Firm* — Sughrue Mion, PLLC

(57) ABSTRACT

A method of distributing group identifiers IDs (GIDs) in a power line communication (PLC) network, a method of receiving the GIDs, an authentication apparatus, and a PLC apparatus are provided. The authentication apparatus includes: an authentication mode storing unit which stores an authentication mode having a value including one of an authentication authorized mode and an authentication unauthorized mode; a GID request receiver which receives a GID request message from a PLC apparatus; and a GID transmitter which, if the authentication mode is the authentication authorized mode, transmits a GID corresponding to the PLC apparatus to the PLC apparatus. Authentication is realized in a PLC media access control layer distributing the GIDs between a PLC apparatus and an authentication apparatus, so manually inputting a GID into the PLC apparatus is not necessary. Further, the GIDs are distributed via the authentication apparatus, thereby centrally managing the GIDs.

22 Claims, 8 Drawing Sheets

(56) References Cited

U.S. PATENT DOCUMENTS

| | | | |
|---|---|---|---|
| 7,092,693 B2 * | 8/2006 | Boyden et al. | 455/402 |
| 7,359,988 B2 * | 4/2008 | Kim et al. | 709/245 |
| 2002/0116342 A1 | 8/2002 | Hirano et al. | |
| 2003/0053477 A1 | 3/2003 | Kim et al. | |
| 2003/0055923 A1 | 3/2003 | Kim et al. | |
| 2007/0154011 A1 * | 7/2007 | Yoshihara et al. | 379/413.03 |
| 2007/0192488 A1 * | 8/2007 | DaCosta | 709/225 |

FOREIGN PATENT DOCUMENTS

| | | |
|---|---|---|
| JP | 2004-515090 A | 5/2004 |
| JP | 2005-072724 A | 3/2005 |
| JP | 2005-341094 A | 12/2005 |
| JP | 2006-50321 A | 2/2006 |
| JP | 2006-505969 A | 2/2006 |
| KR | 10-2005-0091365 A | 9/2005 |
| WO | 01/82550 A2 | 11/2001 |
| WO | WO 01/95557 A2 | 12/2001 |
| WO | 02/091680 A2 | 11/2002 |
| WO | 2005/117331 A1 | 12/2005 |

OTHER PUBLICATIONS

Notice of Allowance dated Jun. 5, 2007, issued by the Korean Intellectual Property Office in Korean Application No. 10-2006-0023572.

Communication dated Dec. 23, 2011 from the State Intellectual Property Office of P.R. China in counterpart Chinese application No. 200710004258.9.

Communication issued May 15, 2012, by the Intellectual Property office of Japan in counterpart Japanese Application No. 2007-010711.

Michael Jong-Hyuck Park et al.; "Hierarchical Medium Access Control (HMAC) based on CSMA/CA for Powerline Communications"; 7th International Symposium on Power-Line Communications and its Applications Mar. 26, 2003; pp. 167-172.

Communication dated Oct. 4, 2011 issued by the Japanese Patent Office in the counterpart Japanese Patent Application No. 2007-010711.

Communication dated Feb. 12, 2013 issued by the Japanese Patent Office in counterpart Japanese Application No. 2007-10711.

* cited by examiner

METHOD OF DISTRIBUTING GROUP IDS IN PLC NETWORK, METHOD OF RECEIVING GROUP IDS IN PLC NETWORK, AUTHENTICATION APPARATUS, AND PLC APPARATUS

CROSS-REFERENCE TO RELATED PATENT APPLICATIONS

This application claims priority of Korean Patent Application No. 10-2006-0023572, filed on Mar. 14, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to power line communication (PLC), and more particularly, to distributing group identifiers IDs (GIDs) in a PLC network.

2. Description of the Related Art

A GID and an encryption key of a PLC Media Access Control (MAC) layer must be identical to each other to perform PLC between PLC modems or PLC embedded devices. The PLC MAC layer decodes frames using the GID and the encryption key.

However, a user manually inputs the GID and the encryption key in a device or sets the GID and the encryption key over a network. When the user manually inputs the GID and the encryption key in the device, the device must include an input unit or an output unit, or an interface connecting the GID and the encryption key to the device. When the user sets the GID and the encryption key over a network, a PLC device must include a remote connector and software.

Further, the user can divide PLC devices into a plurality of cells and form a PLC network. In the related art, the user must memorize a GID of each of the cells and which cell includes which PLC device.

A lot of PLC devices will exist within the home in the future. It is burdensome to set the GID and the encryption key in each of the PLC devices. Furthermore, it can be difficult to set the GID and the encryption key in consumer electronic (CEs) devices without an input unit such as a keyboard or a mouse.

SUMMARY OF THE INVENTION

The present invention provides a method of automatically distributing GIDs to each of power line communication (PLC) devices in a PLC network, an authentication apparatus for distributing the GIDs, and a computer readable recording medium for performing the method of automatically distributing the GIDs.

The present invention also provides a method of receiving GIDs using a PLC apparatus in response to the method of automatically distributing the GIDs, the PLC apparatus for performing the method of receiving the GIDS, and a computer readable recording medium for performing the method of receiving the GIDs.

According to an aspect of the present invention, there is provided a method of distributing GIDs in a PLC network, the method comprising: receiving a GID request message from a PLC apparatus; if an authentication mode is an authentication unauthorized mode, disregarding the GID request message; and if the authentication mode is an authentication authorized mode, transmitting a GID corresponding to the PLC apparatus to the PLC apparatus.

According to another aspect of the present invention, there is provided an authentication apparatus in a PLC network comprising: an authentication mode storing unit which stores an authentication mode having a value comprising one of an authentication authorized mode and an authentication unauthorized mode; a GID request receiver which receives a GID request message from a PLC apparatus; and a GID transmitter, if the authentication mode is the authentication authorized mode, transmits a GID corresponding to the PLC apparatus to the PLC apparatus.

According to another aspect of the present invention, there is provided a PLC apparatus comprising: a mode storing unit storing a mode having a value comprising one of a default mode where the PLC apparatus is unauthenticated and a normal mode where the PLC apparatus is authenticated; a message transmitter transmitting a GID request message to a GID authentication apparatus; a GID receiver receiving the GID from the GID authentication apparatus in response to the GID request message; and an encryption key generator generating an encryption key corresponding to the GID.

According to another aspect of the present invention, there is provided a computer readable recording medium having embodied thereon a computer program for executing a method of receiving a GID in a PLC network, the medium comprising: transmitting a GID request message to a GID authentication apparatus from a PLC apparatus; the PLC apparatus receiving the GID from the GID authentication apparatus in response to the GID request message; and the PLC apparatus generating an encryption key corresponding to the GID.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

A method of distributing GIDs in a PLC network, a method of receiving the GIDs, an authentication apparatus, and a PLC apparatus according to exemplary embodiments of the present invention will now be described with reference to the accompanying drawings.

Figure 1:
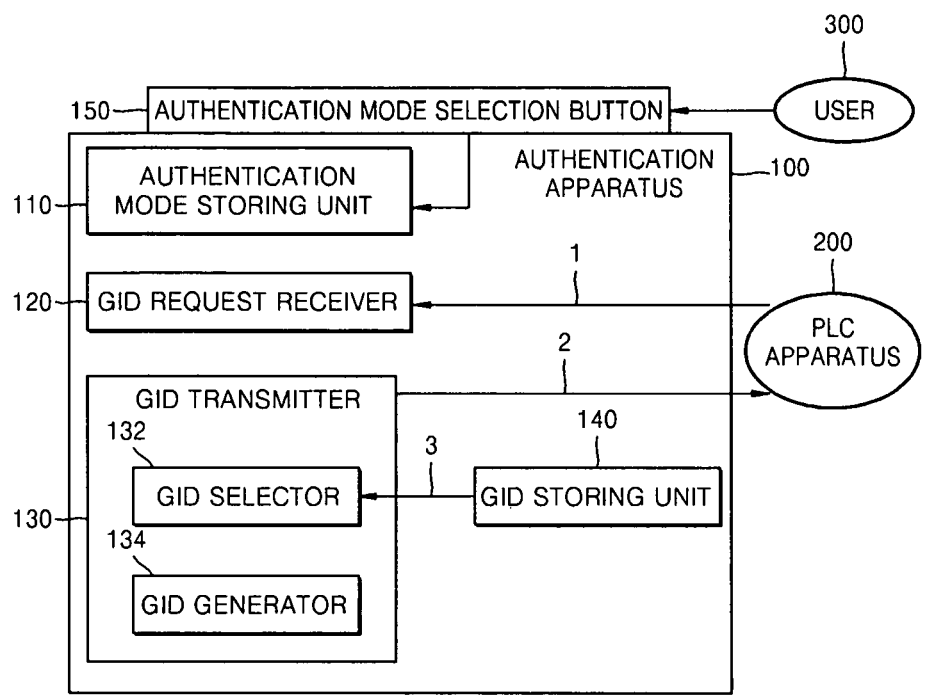
FIG. 1 is a block diagram of an authentication apparatus in a PLC network according to an exemplary embodiment of the present invention.

FIG. 1 is a block diagram of an authentication apparatus 100 in a PLC network according to an exemplary embodiment of the present invention. For descriptive convenience, FIG. 1 further shows a PLC apparatus 200 and a user 300.

The authentication apparatus 100 according to an exemplary embodiment of the present invention may include an authentication function in addition to the PLC apparatus 200. The PLC apparatus 200 comprises a physical layer and a MAC layer. The authentication function may be realized in the PLC MAC layer.

Referring to FIG. 1, the authentication apparatus 100 may include an authentication mode storing unit 110, a GID request receiver 120, a GID transmitter 130, a GID storing unit 140, and an authentication mode selection button 150.

The authentication mode storing unit 110 stores an authentication mode having a value comprising one of an authentication authorized mode and an authentication unauthorized mode.

The GID request receiver 120 receives a GID request message 1 from the PLC apparatus 200.

If the authentication mode stored in the authentication mode storing unit 110 is the authentication authorized mode, the GID transmitter 130 transmits a GID 2 corresponding to a PLC apparatus to the PLC apparatus 200. The GID transmitter 130 may comprise a GID selector 132 and a GID generator 134.

If the PLC apparatus 200 belongs to an existing group, the GID selector 132 selects a GID corresponding to the existing group. When the PLC apparatus 200 belongs to a new group, the GID generator 134 generates a new GID.

The GID storing unit 140 stores a GID list 3 of groups belonging to the PLC network. The GID selector 132 selects a GID from the GID list 3.

The authentication mode selection button 150 selects the authentication mode selected by the user 300.

Figure 2:
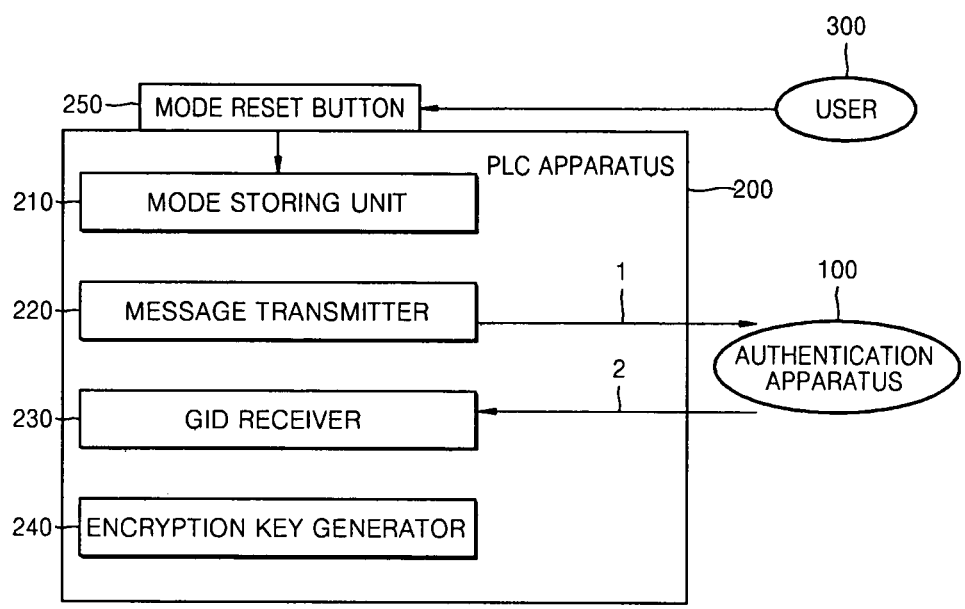
FIG. 2 is a block diagram of a PLC apparatus according to an exemplary embodiment of the present invention.

FIG. 2 is a block diagram of a PLC apparatus 200 according to an exemplary embodiment of the present invention. For descriptive convenience, FIG. 2 further shows an authentication apparatus 100 and a user 300.

Referring to FIG. 2, the PLC apparatus 200 may comprise a mode storing unit 210, a message transmitter 220, a GID receiver 230, an encryption key generator 240, and a mode reset button 250.

The mode storing unit 210 stores a mode having a value comprising one of a default mode and a normal mode. The PLC apparatus 200 is authenticated in the normal mode. The PLC apparatus 200 is initially set to the default mode when.

The message transmitter 220 transmits a GID request message 1 to the authentication apparatus 100. When the default mode is stored in the mode storing unit 210, the message transmitter 220 transmits the GID request message 1.

The GID receiver 230 receives a GID 2 from the authentication apparatus 100 in response to the GID request message 1. Thereafter, the mode storing unit 210 changes the default mode to the normal mode.

The encryption key generator 240 generates an encryption key corresponding to the GID 2.

The mode reset button 250 changes the normal mode stored in the mode storing unit 210 to the default mode selected by the user 300. The user 300 operates the mode reset button 250 and changes the normal mode to the default mode, which is referred to as a mode reset.

Figure 3:
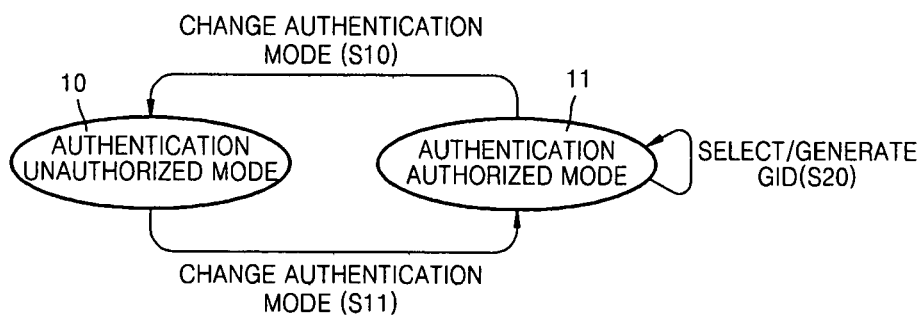
FIG. 3 is a diagram of mode variances of the authentication apparatus according to an exemplary embodiment of the present invention.

FIG. 3 is a diagram of mode variances of the authentication apparatus 100 according to an exemplary embodiment of the present invention. Referring to FIG. 3, an authentication mode is classified as either an authentication authorized mode 10 or an authentication unauthorized mode 11. The user 300 operates the authentication mode selection button 150 and changes the authentication authorized mode 11 to the authentication unauthorized mode 10 (Operation S10), or changes the authentication unauthorized mode 10 to the authentication authorized mode 11 (Operation S11).

The authentication apparatus 100 receives the GID request message 1 from the PLC apparatus 200, and selects or generates a GID if the authentication mode is the authentication authorized mode 11 (Operation S20). When the authentication mode is the authentication unauthorized mode 10, the authentication apparatus 100 does not select or generate the GID, and the GID request message 1 is disregarded.

Figure 4:
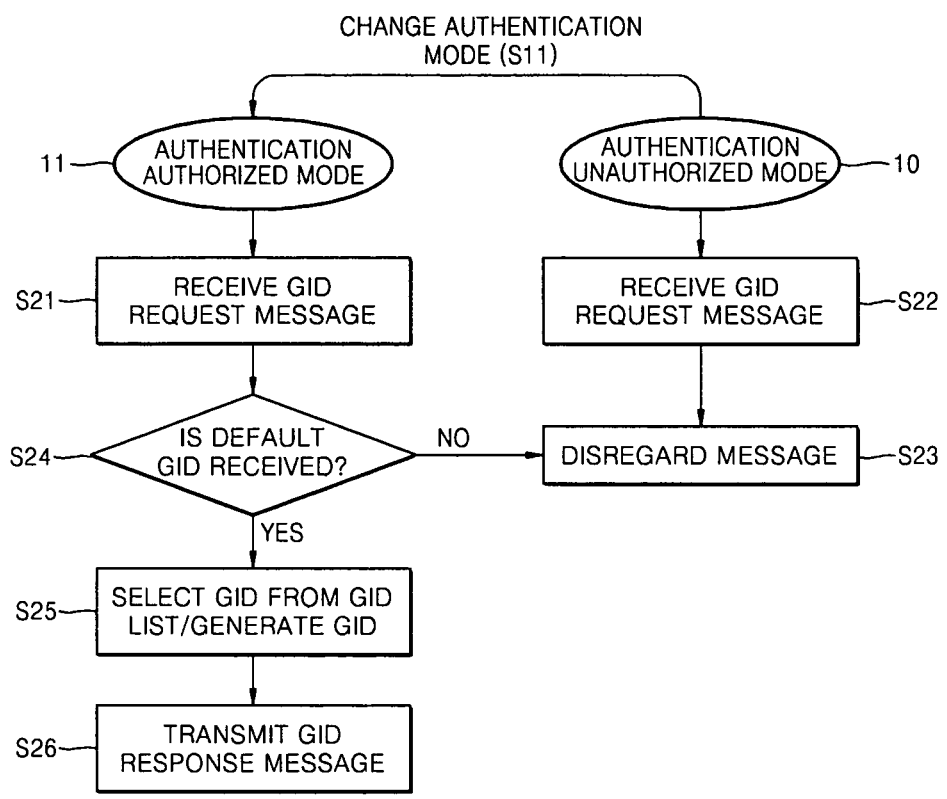
FIG. 4 is a flowchart of a method of distributing GIDs in a PLC network according to an exemplary embodiment of the present invention.

FIG. 4 is a flowchart of a method of distributing GIDs in a PLC network according to an exemplary embodiment of the present invention. Referring to FIG. 4, when the authentication mode is the authentication authorized mode 11, the authentication apparatus 100 receives the GID request message 1 (Operation S21), and determines whether the GID request message 1 includes a default GID (Operation S24).

If the authentication apparatus 100 determines that the GID request message 1 includes the default GID, the GID transmitter 130 selects a GID corresponding to the default GID from the GID list 3 or generates a new GID (Operation S25). When the PLC apparatus 200 belongs to the existing group, the GID transmitter 130 selects the GID from the GID list 3. When a new cell is formed, the GID transmitter 130 generates the new GID. The GID transmitter 130 transmits a GID response message including the selected GID or the generated GID 2 to the PLC apparatus 200 (Operation S26). The PLC apparatus 200 generates an encryption key using the GID, and communicates a message with other PLC apparatuses using the GID and the encryption key.

If the authentication apparatus 100 determines that the GID request message 1 does not include the default GID, the GID transmitter 130 disregards the GID request message 1 (Operation S23).

When the authentication mode is the authentication unauthorized mode 10, the authentication apparatus 100 receives the GID request message 1 (Operation S22), and disregards the GID request message 1 (Operation S23). In the authentication unauthorized mode 10, the authentication apparatus 100 does not authorize the authentication regardless of whether the GID request message 1 includes the default GID. The user 300 sets the mode of the authentication apparatus 100 as the authentication unauthorized mode 10 so that a new PLC apparatus cannot be used at the user's home.

Figure 5:
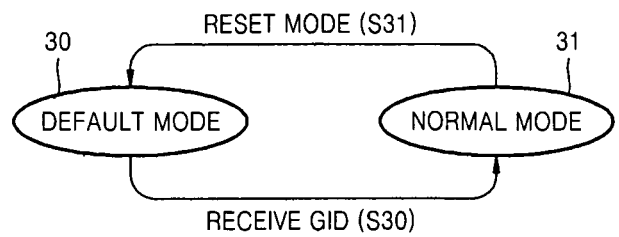
FIG. 5 is a diagram of mode variances of the PLC apparatus according to an exemplary embodiment of the present invention.

FIG. 5 is a diagram of mode variances of the PLC apparatus 200 according to an exemplary embodiment of the present invention. Referring to FIG. 5, the mode of the PLC apparatus 200 is classified as either a default mode 30 or a normal mode 31. The PLC apparatus 200 is initially set to the default mode 30 and includes a default GID and a default encryption key.

When the PLC apparatus 200 receives a GID from the authentication apparatus 100 and the GID is authenticated (Operation S30), the default mode 30 is changed to the normal mode 31. When the PLC apparatus 200 is at the normal mode 31, the PLC apparatus 2200 communicates with other PLC apparatuses using the GID received from the authentication apparatus 100.

The user 300 operates the mode reset button 250 (Operation S31) and changes the normal mode 31 to the default mode 30.

Figure 6:
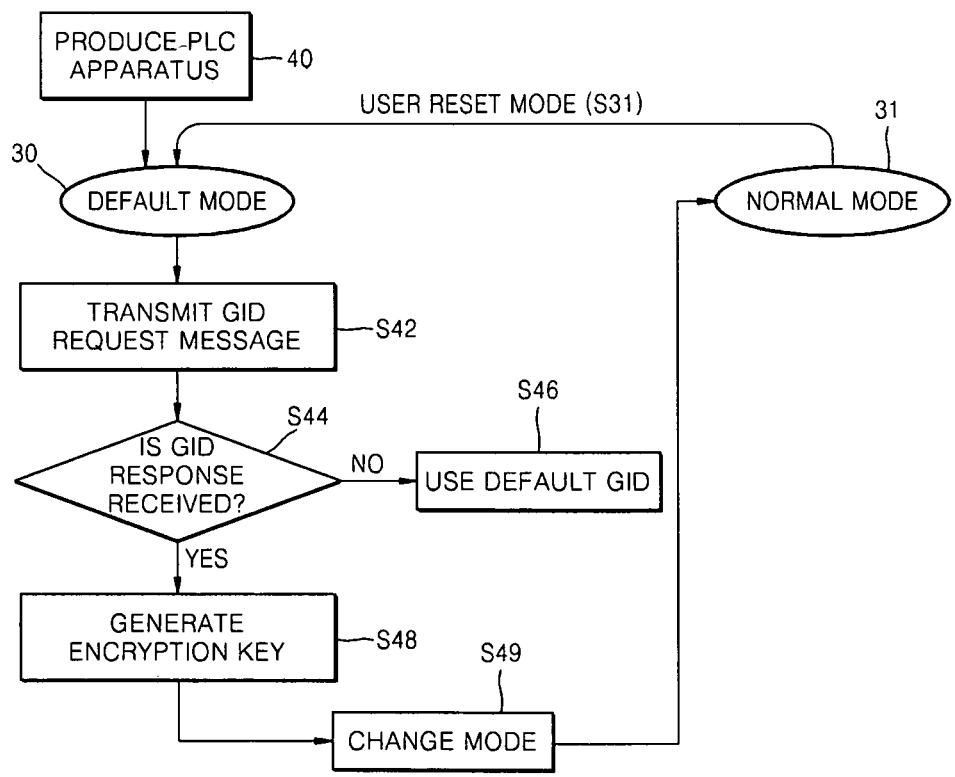
FIG. 6 is a flowchart of a method of receiving a GID in a PLC network according to an exemplary embodiment of the present invention.

FIG. 6 is a flowchart of a method of receiving a GID in a PLC network according to an exemplary embodiment of the present invention. Referring to FIG. 6, the PLC apparatus 200 is initially set to the default mode 30 when produced 40. The user 300 can operate the mode reset button 250 and change the normal mode 31 to the default mode 30 (Operation S31). In the default mode 30, the PLC apparatus 200 transmits the GID request message 1 including a default GID to the authentication apparatus 100 (Operation S42).

The PLC apparatus 200 stands by while the authentication apparatus 100 transmits the GID 2 corresponding to the GID request message 1 (Operation S44).

When the mode of the authentication apparatus 100 is the authentication authorized mode 11, the authentication apparatus 100 transmits the GID 2. The PLC apparatus 200 receives the GID 2 and generates an encryption key corresponding to the GID 2 (Operation S48). The PLC apparatus 200 changes the default mode 30 to the normal mode 31 (Operation S49).

When the mode of the authentication apparatus 100 is the authentication unauthorized mode 10, the authentication apparatus 100 does not transmit the GID 2. The PLC apparatus 200 does not receive the GID 2 but communicates with other PLC apparatuses using the default GID (Operation S46).

Figure 7:
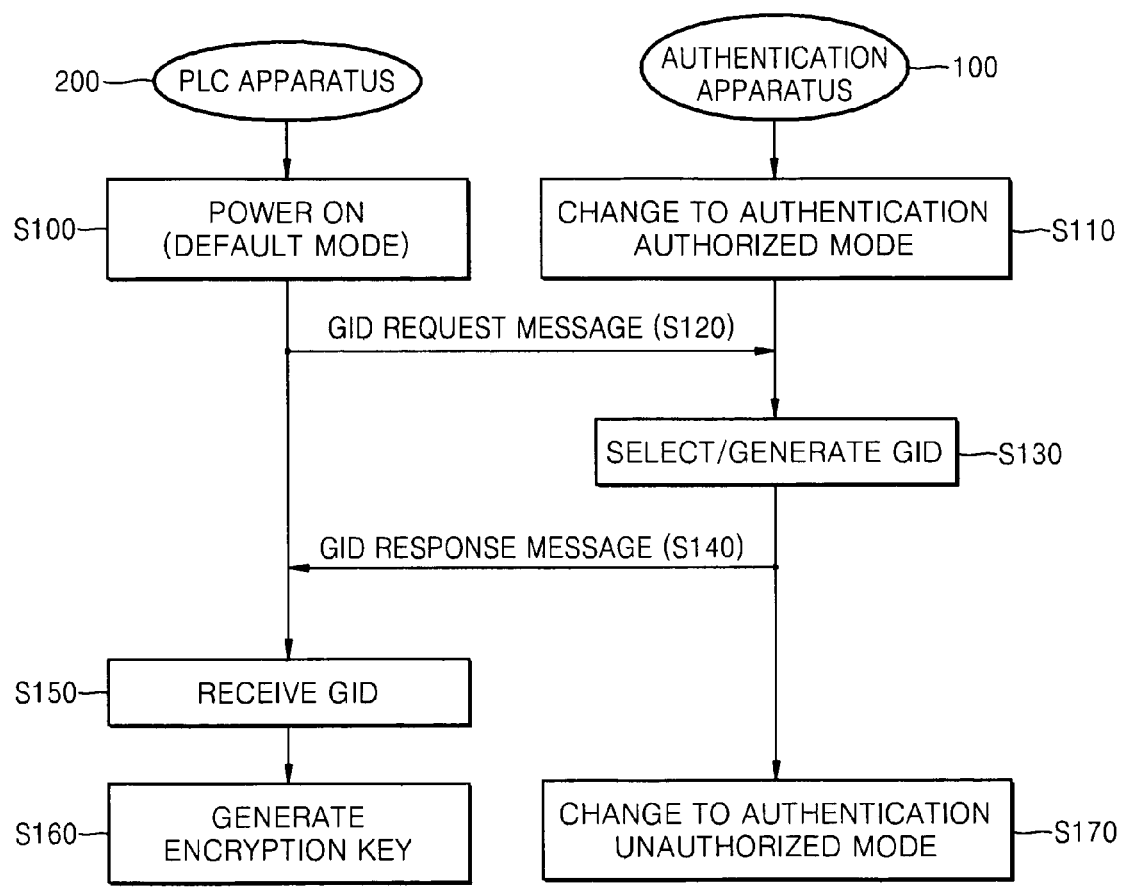
FIG. 7 is a flowchart of an operation of receiving a GID using an initialized PLC apparatus according to an exemplary embodiment of the present invention.

FIG. 7 is a flowchart of an operation of receiving a GID using an initialized PLC apparatus according to an exemplary embodiment of the present invention. Referring to FIG. 7, when the PLC apparatus 200 is initially powered on for the first time (Operation S100), the mode of the PLC apparatus 200 is set to a default mode. To distribute GIDs to the PLC apparatus 200 having a default GID, the user 300 must change the mode of the authentication apparatus 100 to the authentication authorized mode 11 (Operation S110).

If the PLC apparatus 200 transmits the GID request message 1 (Operation S120), the authentication apparatus 100 selects or generates the GID (Operation S130), and transmits a GID response message (Operation S140). The GID request message 1 must include the GID of the PLC apparatus 200. The GID response message must include the GID 2 to be used by the PLC apparatus 200.

The PLC apparatus 200 receives the GID (Operation S150), and generates an encryption key using the GID (Operation S1160).

The user changes the authentication authorized mode 11 to the authentication unauthorized mode 10 in order to prevent other PLC apparatuses from being authenticated (Operation S1170).

According to the current exemplary embodiment, the PLC apparatus 200 is first installed in a house.

Figure 8:
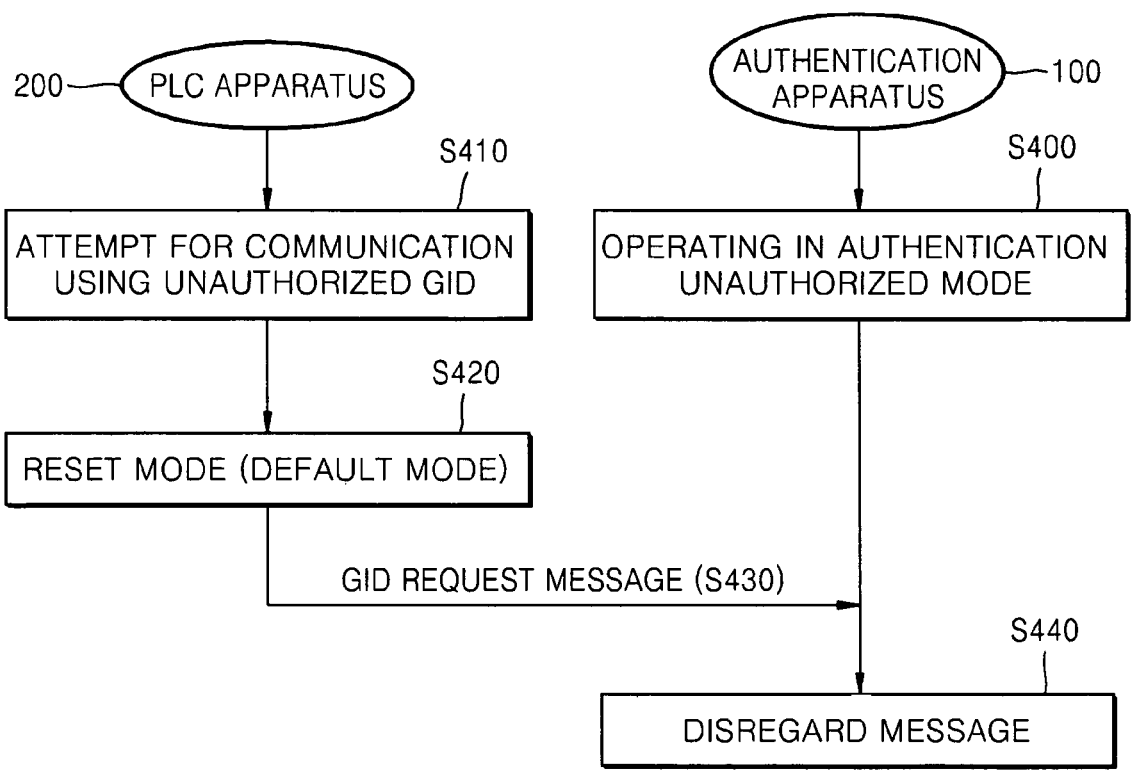
FIG. 8 is a flowchart of an operation of receiving a GID using an unauthorized PLC apparatus when the authentication apparatus is in an authentication unauthorized mode according to an exemplary embodiment of the present invention.

FIG. 8 is a flowchart of an operation of receiving a GID using an unauthorized PLC apparatus when the authentication apparatus 100 is in the authentication unauthorized mode 10 according to an exemplary embodiment of the present invention. Referring to FIG. 8, the unauthorized PLC apparatus joins a specific cell (Operation S410).

The PLC apparatus 200 changes its mode to the default mode through the mode reset (Operation S420), and transmits the GID request message 1 to the authentication apparatus 100 (Operation S430).

Since a manager of the specific cell sets the mode of the authentication apparatus 100 as the authentication unauthorized mode 10 (Operation S400), the authentication apparatus 100 disregards the GID request message 1 including the default ID (Operation S440) to prevent the unauthorized PLC apparatus from joining the specific cell.

Figure 9:
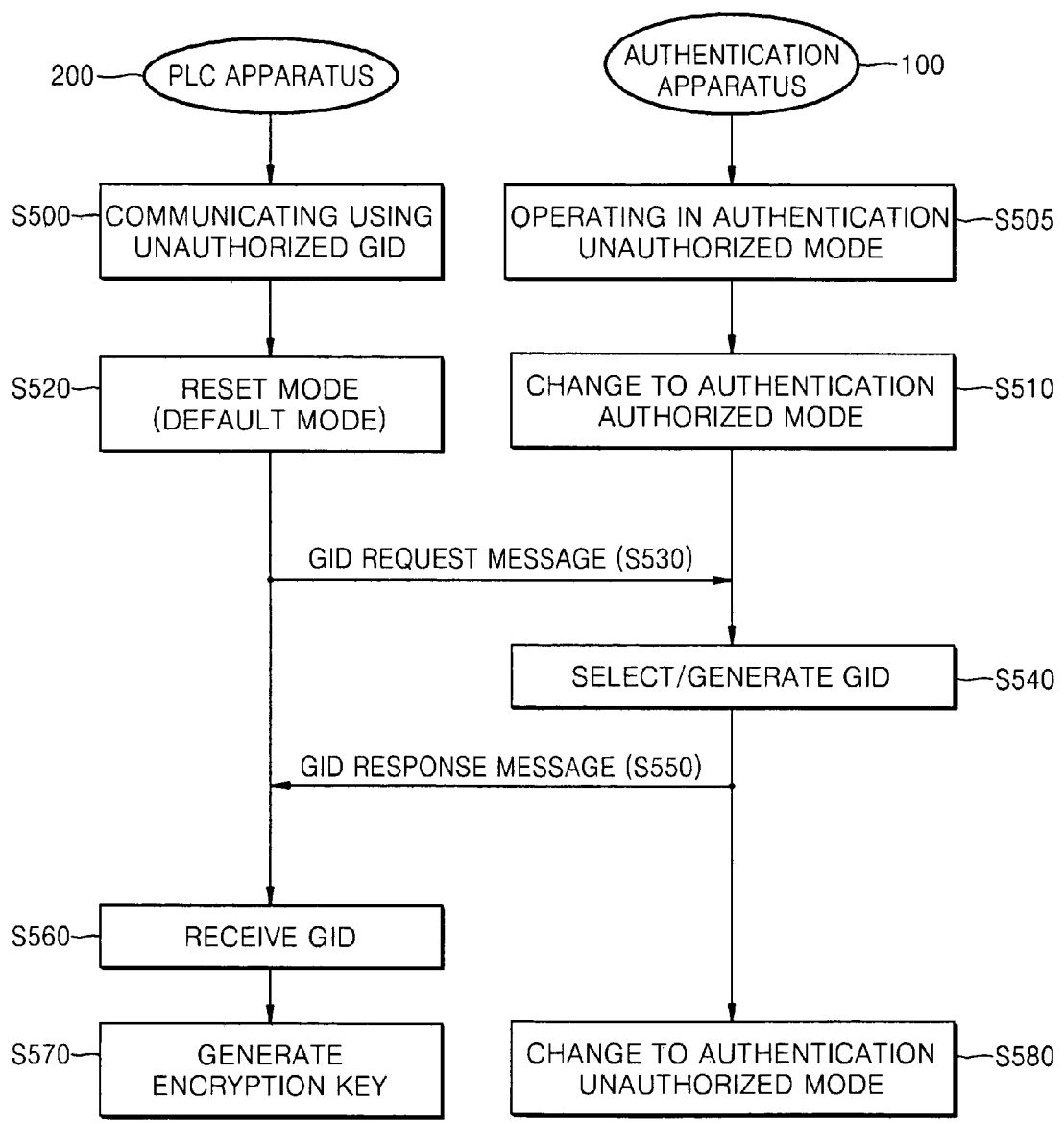
FIG. 9 is a flowchart of an operation of authenticating an unauthorized PLC apparatus when the authentication apparatus is in an authentication authorized mode according to an exemplary embodiment of the present invention.

FIG. 9 is a flowchart of an operation of authenticating an unauthorized PLC apparatus when the authentication apparatus 100 is in the authentication authorized mode 11 according to an exemplary embodiment of the present invention. Referring to FIG. 9, the user 300 changes the mode of the authentication apparatus 100 to the authentication authorized mode 11 (Operation S510), and resets the mode of the PLC apparatus 200 to be changed to a default mode (Operation S520). The PLC apparatus 200 transmits the GID request message 1 (Operation S530). The authentication apparatus 100 receives the GID request message 1 from the PLC apparatus 200, selects or generates a GID (Operation S540), and transmits a GID response message (Operation S550).

The PLC apparatus 200 receives the GID (Operation S560), and generates an encryption key (Operation S570).

After the PLC apparatus 200 is authenticated, the user 300 changes the mode of the authentication apparatus 100 to the authentication unauthorized mode 10 (Operation S580).

According to the current exemplary embodiment, a PLC apparatus that receives the GID from an authentication apparatus belonging to another cell and communicates with other PLC apparatuses (Operation S500) is authenticated using an authentication apparatus belonging to a current cell.

Figure 10:
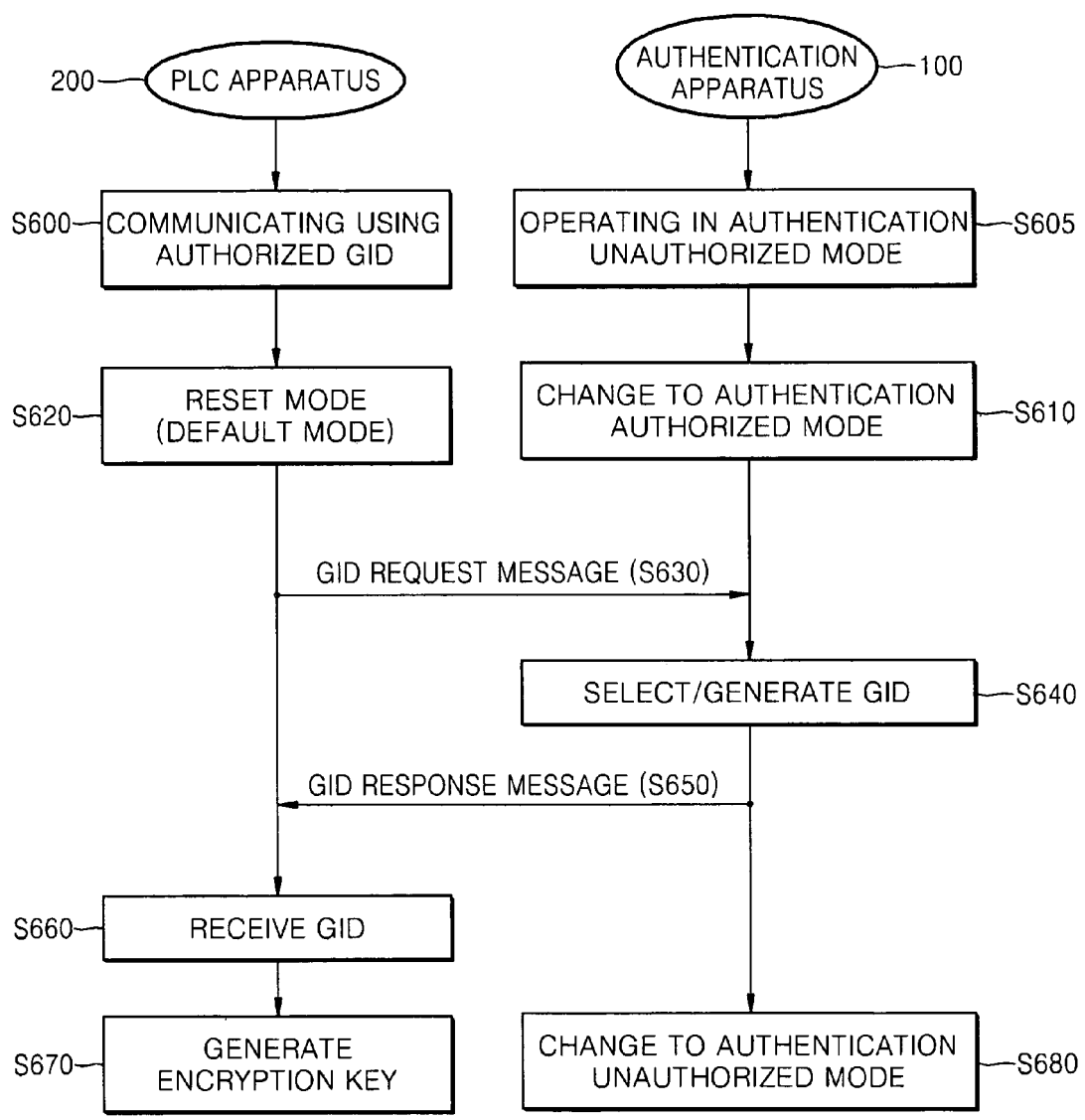
FIG. 10 is a flowchart of an operation of changing a GID using an authorized PLC apparatus according to an exemplary embodiment of the present invention.

FIG. 10 is a flowchart of an operation of changing a GID using an authorized PLC apparatus according to an exemplary embodiment of the present invention. Referring to FIG. 10, an operation of changing the GID of the PLC apparatus that receives the GID and communicates with other PLC apparatuses (Operation S600) will now be described.

The mode of the authentication mode 100 is changed to the authentication authorized mode 11 (Operation S610), and the mode of the PLC apparatus 200 is reset (Operation S620) to transmit the GID request message 1 (Operation S630). Operations S640, S650, S660, S670, and S680 are identical to operations as described in a previous exemplary embodiment and thus their descriptions are omitted.

According to an exemplary embodiment of the present invention, an authentication function can be included in a PLC apparatus. Therefore, an authentication apparatus can easily distribute GIDs to the PLC apparatus connected to an authentication apparatus, so that the PLC apparatus can be added to an existing PLC cell or form a new PLC cell.

The authentication apparatus can present GIDs included in a GID list and a list of PLC apparatuses corresponding to the GIDs of a user. PLC MAC substantially uses a 46-bit GID. However, the authentication apparatus converts the GIDS and the list of the PLC apparatuses into IDs or values in order to easily present them to the user. The user can centrally manage the GIDs using only the authentication function. Therefore, it is not necessary to manually input the GIDs into the PLC apparatuses in order to distribute the GIDs. It is also possible to easily distribute the GIDs to PLC apparatuses that do not have a user interface.

The present invention can also be embodied as a computer-readable program stored on a computer-readable recording medium. The computer-readable recording medium comprises any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the method of distributing GIDs in a PLC network, a method of receiving the GIDs, the authentication apparatus, and the PLC apparatus of the exemplary embodiments of the present invention, an authentication function is realized in a PLC MAC layer to distribute the GIDs between a PLC apparatus and an authentication apparatus, so that it is not necessary for a user to manually input a GID into the PLC apparatus. Further, the GIDs are distributed via the authentication apparatus, thereby centrally managing the GIDs.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of distributing group identifiers IDs (GIDs) in a power line communication (PLC) network, the method comprising:
   receiving, by a PLC authentication apparatus that automatically distributes GIDs of the PLC network, a GID request message from a PLC apparatus, the GID request message requesting the PLC authentication apparatus to transmit a GID of the PLC network to the PLC apparatus;
   determining, by the PLC authentication apparatus, whether an authentication mode of the PLC apparatus is one of an authorized mode in which the PLC authentication apparatus is authorized to transmit the GID to the PLC apparatus and an unauthorized mode in which the PLC authentication apparatus is not authorized to transmit the GID to the PLC apparatus, wherein the authentication mode is set by a user before the determining;
   one of disregarding the GID request message, in response to determining that the authentication mode is the unauthorized mode, and transmitting the GID to the PLC apparatus, in response to determining the authentication mode is the authorized mode,
   wherein the determining and one of disregarding and transmitting are performed automatically and the transmitted GID is automatically set as a GID for the PLC apparatus at the PLC apparatus.

2. The method of claim 1, wherein the transmitting of the GID to the PLC apparatus further comprises:
   determining whether the GID request message includes a default GID; and
   one of disregarding the GID request message, in response to determining that the GID request message does not include the default GID, and transmitting the GID to the PLC apparatus, in response to determining that the GID request message includes the default GID.

3. A method of receiving a group identifier ID (GID) in a power line communication (PLC) network, the method comprising:
   transmitting, by a PLC apparatus, a GID request message to a PLC authentication apparatus, the GID request message requesting the PLC authentication apparatus to assign transmit a GID of the PLC network to the PLC apparatus;
   automatically receiving, at the PLC apparatus, the GID from the PLC authentication apparatus, in response to transmitting the GID request message; and
   generating at the PLC apparatus an encryption key corresponding to the received GID,
   wherein the received GID is automatically set as a GID of the PLC apparatus at the PLC apparatus.

4. The method of claim 3, wherein the transmitting is performed in response to setting a mode of the PLC apparatus to a default mode in which a default GID is assigned to the PLC apparatus.

5. The method of claim 4, wherein the PLC apparatus is initialized to the default mode before the transmitting of the GID request message.

6. The method of claim 3, further comprising changing the default mode of the PLC apparatus to a normal mode in response to receiving the GID before the transmitting of the GID request message.

7. An authentication apparatus in a power line communication (PLC) network comprising:
   an authentication mode storing unit which stores an authentication mode of the authentication apparatus, the authentication mode comprising one of an authorized mode in which the authentication apparatus is authorized to assign a group identifier (GID) to a PLC apparatus and an unauthorized mode in which the authentication apparatus is not authorized to assign the GID to the PLC apparatus;
   a GID request receiver which receives a GID request message from the PLC apparatus, the GID request message requesting the authentication apparatus to transmit a GID to the PLC apparatus; and
   a GID transmitter which determines whether the authentication mode of the authentication apparatus is one of the authorized mode and the unauthorized mode, and transmits the GID to the PLC apparatus, in response to determining that the authentication mode is the authorized mode, and disregards the GID request message, in response to determining the authentication mode is the unauthorized mode,
   wherein the GID transmitter's determining and one of the transmitting and the disregarding are performed automatically and the transmitted GID is automatically set as a GID for the PLC apparatus at the PLC apparatus.

8. The apparatus of claim 7, further comprising a GID storing unit which stores a list of GIDs of groups belonging to the PLC network and a GID selector that selects the GID from among the list of the GIDs stored in the GID storing unit.

9. The apparatus of claim 7, wherein the GID transmitter further determines whether the GID request message includes a default GID and one of disregards the GID request message, in response to determining that the GID request message does not include the default GID, and transmits the GID to the PLC apparatus, in response to determining that the GID request message includes the default GID.

10. The apparatus of claim 7, the apparatus further comprising an authentication mode selection interface operated by a user to set the authentication mode to the one of the authorized mode and the unauthorized mode.

11. A power line communication (PLC) apparatus comprising:
   a message transmitter which transmits a group identifier ID (GID) request message to a PLC authentication apparatus of a PLC network, the GID request message requesting the PLC authentication apparatus to transmit a GID of the PLC network to the PLC apparatus;

a GID receiver which automatically receives the GID from the PLC authentication apparatus in response to transmitting the GID request message; and an encryption key generator which generates an encryption key corresponding to the received GID, wherein the received GID is automatically set as a GID of the PLC apparatus at the PLC apparatus.

12. The apparatus of claim 11, wherein the message transmitter transmits the GID request message in response to a mode of the PLC apparatus set to a default mode in which a default GID is assigned to the PLC apparatus.

13. The apparatus of claim 11, wherein the PLC apparatus is initialized to the default mode before the message transmitter transmits the GID request message.

14. The apparatus of claim 11, wherein the mode storing unit changes the default mode of the PLC apparatus to a normal mode in response to the GID receiver receiving the GID from the PLC authentication apparatus before the message transmitter transmits the GID request message.

15. The apparatus of claim 11, further comprising a mode reset interface operated by a user to set the default mode.

16. A non-transitory computer-readable recording medium having embodied thereon a computer program for executing a method of distributing group identifiers IDs (GIDs) in a power line communication (PLC) network, the medium comprising:

receiving, by a PLC authentication apparatus that automatically distributes GIDs of the PLC network, a GID request message from a PLC apparatus, the GID request message requesting the PLC authentication apparatus to transmit a GID of the PLC network to the PLC apparatus;

determining, by the PLC authentication apparatus, whether an authentication mode of the PLC apparatus is one of an authorized mode in which the PLC authentication apparatus is authorized to transmit the GID to the PLC apparatus and an unauthorized mode in which the PLC authentication apparatus is not authorized to transmit the GID to the PLC apparatus;

one of disregarding the GID request message, in response to determining that the authentication mode is the unauthorized mode, and transmitting the GID to the PLC apparatus in response to determining the authentication mode is the authorized mode, wherein the determining and one of disregarding and transmitting are performed automatically and the transmitted GID is automatically set as a GID for the PLC apparatus at the PLC apparatus.

17. A non-transitory computer readable recording medium having embodied thereon a computer program for executing a method of receiving a group identifier ID (GID) in a power line communication (PLC) network, the medium comprising:

transmitting, by a PLC apparatus, a GID request message to a PLC authentication apparatus, the GID request message requesting the PLC authentication apparatus to transmit a GID of the PLC network to the PLC apparatus;

automatically receiving, at the PLC apparatus, the GID from the PLC authentication apparatus, in response to transmitting the GID request message; and generating at the PLC apparatus an encryption key corresponding to the received GID, wherein the received GID is automatically set as a GID of the PLC apparatus at the PLC apparatus.

18. The method of claim 1, wherein the transmitting of the GID comprises:

determining whether there exists a group of PLC devices on the PLC network to which the PLC apparatus belongs; and one of selecting the GID corresponding to the existing group and transmitting the selected GID to the PLC apparatus, in response to determining that there exists the group to which the PLC apparatus belongs, and generating the GID and transmitting the generated GID to the PLC apparatus, in response to determining that there does not exist the group to which the PLC apparatus belongs.

19. The authentication apparatus of claim 7, wherein the GID further determines whether there exists a group of PLC devices on the PLC network to which the PLC apparatus belongs, and one of selects the GID corresponding to the existing group and transmits the selected GID to the PLC apparatus, in response to determining that there exists the group to which the PLC apparatus belongs, and generates the GID and transmits the generated GID to the PLC apparatus, in response to determining that there does not exist the group to which the PLC apparatus belongs.

20. The method of claim 3, wherein the GID is received if an authentication mode of the GID authentication apparatus is an authorized mode and the GID is not received if the authentication mode is an unauthorized mode.

21. The method of claim 11, wherein the GID is received if an authentication mode of the GID authentication apparatus is an authorized mode and the GID is not received if the authentication mode is an unauthorized mode.

22. The method of claim 18, wherein the selecting of the GID corresponding to the existing group comprises selecting the GID corresponding to the existing group from a list of GIDs used by the PLC authentication apparatus.

* * * * *